United States Patent
Heyl et al.

(10) Patent No.: US 12,345,999 B2
(45) Date of Patent: Jul. 1, 2025

(54) ACOUSTO-OPTICAL MODULATOR APPARATUS AND METHOD OF ACOUSTO-OPTICALLY DEFLECTING A LASER BEAM

(71) Applicants: Deutsches Elektronen-Synchrotron DESY, Hamburg (DE); GSI Helmholtzzentrum fuer Schwerionenforschung GmbH, Darmstadt (DE)

(72) Inventors: Christoph Heyl, Darmstadt (DE); Tino Lang, Hamburg (DE)

(73) Assignees: Deutsches Elektronen-Synchrotron DESY, Hamburg (DE); GSI Helmholtzzentrum fuer Schwerionenforschung GmbH, Darmstadt (DE)

( * ) Notice: Subject to any disclaimer, the term of this patent is extended or adjusted under 35 U.S.C. 154(b) by 881 days.

(21) Appl. No.: 17/509,754

(22) Filed: Oct. 25, 2021

(65) Prior Publication Data

US 2022/0128883 A1 Apr. 28, 2022

(30) Foreign Application Priority Data

Oct. 27, 2020 (EP) .................................... 20204089

(51) Int. Cl.
   *G02F 1/33* (2006.01)
(52) U.S. Cl.
   CPC ..................... *G02F 1/33* (2013.01)
(58) Field of Classification Search
   CPC ...... G02F 1/335; G02F 1/1326; G02F 1/0151; G02F 1/3515; G02F 1/332; G02F 1/33
   See application file for complete search history.

(56) References Cited

U.S. PATENT DOCUMENTS 3,800,303 A * 3/1974 Picquendar ............... G02F 1/33
                                                      359/305
5,045,719 A   9/1991 Ayral et al.
(Continued)

FOREIGN PATENT DOCUMENTS

GB           1113917 A    5/1968

OTHER PUBLICATIONS

De Lima et al. (2003). Focusing of surface-acoustic-wave fields on (100) GaAs surfaces. Journal of Applied Physics, 94(12), 7848-7855.

(Continued)

*Primary Examiner* — Ricky L Mack
*Assistant Examiner* — Journey F Sumlar
(74) *Attorney, Agent, or Firm* — Caesar Rivise, PC

(57) ABSTRACT

Acousto-optical modulator apparatus for acousto-optically deflecting laser beam includes gas-filled volume including working gas and having input and output sections, for receiving beam along incidence light path via input section and transmitting beam along deflection light path via output section, and ultra-sound transducer device for creating ultra-sound field intersecting incidence light path in interaction region within gas-filled volume and creating periodic density modulation of working gas in interaction region, ultra-sound transducer device deflecting beam in interaction region by Bragg-diffraction in ultra-sound field, so that deflection light path has direction deviating from direction of incidence light path, wherein gas-filled volume keeps working gas at working pressure below bar and input section and output section transmit beam with laser center wavelength included in wavelength range from mid-IR to XUV. Preferably, ultra-sound transducer device focuses ultra-sound field in interaction region. Furthermore, a method of (Continued)

acousto-optically deflecting laser beam in working gas is disclosed.

27 Claims, 4 Drawing Sheets

(56) References Cited

U.S. PATENT DOCUMENTS

| | | |
|---|---|---|
| 5,576,880 A | 11/1996 | Chang |
| 5,917,188 A * | 6/1999 | Atkinson ............... G01N 21/39 |
| | | 250/343 |
| 8,520,288 B2 | 8/2013 | Castile |
| 2003/0030886 A1 | 2/2003 | Thomas |
| 2017/0131617 A1* | 5/2017 | Hua .................. B23K 26/0622 |

OTHER PUBLICATIONS

Duerr. (1986). Acousto-optic interaction in gases and liquid bases in the far infrared. International Journal of Infrared and Millimeter Waves, 7(10), 1537-1558.

Drescher et al. (2018). Extreme-ultraviolet refractive optics, Nature, 564, 91-95.

Heshmat et. al. (2012). The effect of detector distance and beam width in acousto-optical beam deflection probing in air. Optics & Laser Technology, 44, 734-740.

Mys et al. (2014). Anisotropy of acousto-optic figure of merit in optically isotropic media. Applied Optics, 53(20), 4616-4627.

Lang. Screenshot captured from http://www.chi23d.com on Jan. 13, 2022.

* cited by examiner

ACOUSTO-OPTICAL MODULATOR APPARATUS AND METHOD OF ACOUSTO-OPTICALLY DEFLECTING A LASER BEAM

CROSS-REFERENCE TO RELATED APPLICATIONS

This application claims priority to EP 20204089.5 filed Oct. 27, 2020, the contents of which are incorporated herein by reference in their entireties for all purposes.

FIELD OF THE INVENTION

The invention relates to an acousto-optical modulator apparatus, being configured for acousto-optically deflecting at least one laser beam in a working gas including a periodic density modulation which is created by an ultra-sound field. Furthermore, the invention relates to a method of acousto-optically deflecting a laser beam in a density modulated working gas. Applications of the invention are available e. g. in manipulations of laser beams in a broad wavelength range from mid-IR to XUV, for instance for beam splitting, beam combining and/or beam extraction from resonators or fast manipulation or picking of high energetic laser pulses.

TECHNICAL BACKGROUND

In the present specification, reference is made to the following prior art illustrating the technical background of the invention, in particular relating to acousto-optical modulators:

[1] Durr et al., Int. Journal of Infrared and Millimeter Waves, Vol. 7, No. 10, 1986:
 [2] Heshmat et. al., Opt. & Laser Techn. 44, 2012
 [3] Drescher, L., Kornilov, O., Witting, T. et al. "Extreme-ultraviolet refractive optics", Nature 564, 91-94 (2018). https://doi.org/10.1038/s41586-018-0737-3
 [4] U.S. Pat. No. 8,520,288 B2; and
 [5] http://www.chi23d.com.

Ultrafast manipulation of laser beams (in particular deflection, beam splitting, beam combining and/or phase modulation) by employing acousto-optical modulators (AOMs) is generally known. In a standard bulk AOM, the laser beam gets deflected via Bragg-diffraction at an ultrasonic wave propagating inside a solid bulk material. This process is limited in laser power due to nonlinear propagation effects in the bulk material, which cause beam distortions at high powers. Larger beam diameters can allow for higher laser power, but will reduce the switching rate, which is determined by the time it takes the ultras-sound wave to transverse the laser beam. Standard AOMs can be operated at a bandwidth (defining the switching rate) of about 1 MHz for the distortion-free deflection of laser pulses with durations reaching the few-picosecond regime at pulse energies approaching the 1 mJ regime. Much higher laser pulse energies can be passed through a bulk-based AOM, however, this causes unavoidable laser pulse distortion, which can be detrimental for applications such as e.g. pulse stacking in optical resonators.

In addition, the use of a bulk medium goes along with losses due to surface reflection and absorption and causes thermal limitation at high average powers as well as damage problems at high peak powers. Absorption losses also limit the wavelength range in which AOMs can be operated and causes detrimental losses when operated in optical resonators. In particular, AOMs from an early phase of AOM development were restricted to the visible wavelength range.

For extending the wavelength range to the far-infrared (FIR) wavelength range, replacing the bulk material by a working gas has been proposed in the 1980ies already ([1]). In this case, the laser beam is deflected via Bragg-diffraction at a density modulation induced by an ultrasonic wave propagating inside the working gas. The working gas is used at high density, i.e. at normal conditions under high pressure. To this end, the working gas is arranged in a high pressure cell with a pressure in a range from 50 to 100 bar. The high pressure cell has pressure-resistant windows through which the FIR laser beam is directed into and out of the cell.

In particular due to the required provision of the high pressure cell, the gas-based AOM of [1] has the following disadvantages. The solid material of the windows limits the wavelength range on the short wavelength side, in particular starting by the onset of two-photon absorption. The windows would absorb a laser beam in particular in the ultraviolet (UV) to extreme ultraviolet (XUV) wavelength range, distort a high-power laser beam and limit the applied peak power to the laser induced damage threshold (LIDT) of the window material. Furthermore, the high pressure cell results in high costs and complexity of the AOM and the operation thereof. Therefore, the AOM of [1] has not found practical applications.

An arrangement for laser beam bending via gas density gradients produced by an unfocused ultras-sound wave is described in [4]. A laser beam intersects an ultras-sound wave in air in free space (i. e. no cell or window is used) perpendicular to the ultras-sound wave propagation. The effect used for beam bending in the gas density gradient is similar to the effect used for gas lenses, but differs from acousto-optical modulation for beam diffraction in AOMs as follows. The technique of [4] is restricted to laser beams with a diameter smaller than half the ultras-sound wavelength. Upon passage thought the ultras-sound beam, the laser beam undergoes only a gas density gradient, but not a periodic density modulation as employed for acousto optical modulation. Furthermore, the acoustic wave intersects the laser beam perpendicular to the propagation direction of the laser beam. The Bragg angle between the two beams as employed for acousto optical diffraction in one distinct diffraction order is not provided. Thus, the experiment of [4] excludes acousto optical modulation and cannot be used for efficient deflection in particular of high-power and/or XUV beams.

The usage of refractive index gradients or modulations in gases for beam manipulation applications is also described in [3] and [4]. However, these techniques cannot be employed for AOM applications.

OBJECTIVE OF THE INVENTION

Objectives of the invention are to provide an improved acousto-optical modulator apparatus for acousto-optically deflecting at least one laser beam and an improved method of acousto-optically deflecting a laser beam, avoiding disadvantages of conventional techniques and/or providing new or extended applications of AOMs. In particular, acousto-optical deflection is to be made available with an extended wavelength range, in particular in the UV up to the XUV range, increased laser beam energies, reduced losses, increased deflection efficiency, reduced complexity (in particular avoiding a high pressure cell), reduced risk of laser beam distortions and/or reduced thermal limitations, in particular reduced risk of optical damages.

SUMMARY OF THE INVENTION

The above objectives are solved by an acousto-optical modulator apparatus and a method of acousto-optically deflecting a laser beam of the invention.

According to a first general aspect of the invention, the above objective is solved by a n acousto-optical modulator apparatus, being configured for acousto-optically deflecting a laser beam, preferably a pulsed laser beam, comprising a gas-filled volume including a working gas and having an input section and an output section, being arranged for receiving the laser beam along an incidence light path via the input section and for transmitting the laser beam along a deflection light path via the output section, an ultra-sound transducer device being arranged for creating an ultra-sound field (or: ultra-sound-wave) intersecting the incidence light path in an interaction region within the gas-filled volume and creating a periodic density modulation (refractive index modulation) of the working gas in the interaction region, wherein the ultra-sound transducer device is capable of deflecting the laser beam in the interaction region by Bragg-diffraction in the ultra-sound field, so that the deflection light path has a direction deviating from the direction of the incidence light path.

According to the invention, the gas-filled volume is arranged for keeping the working gas at a working pressure below 10 bar and the input section and the output section are capable of transmitting the laser beam with a laser center wavelength included in a wavelength range from mid-IR to XUV. Preferably, the ultra-sound transducer device is configured for focusing the ultra-sound field in the interaction region. Alternatively, in particular in dependency of an amplitude of the ultra-sound field, the ultra-sound transducer device can be configured for creating a non-focused ultra-sound field in the interaction region.

According to a second general aspect of the invention, the above objective is solved by a method of acousto-optically deflecting a laser beam, comprising the steps of providing a gas-filled volume including a working gas and having an input section and an output section, receiving the laser beam along an incidence light path via the input section and transmitting the laser beam along a deflection light path via the output section, creating an ultra-sound field intersecting the incidence light path in an interaction region within the gas-filled volume, wherein a periodic density modulation of the working gas is created in the interaction region, and deflecting the laser beam in the interaction region by the effect of Bragg-diffraction in the ultra-sound field, so that the deflection light path has a direction deviating from the direction of the incidence light path.

According to the invention, the working gas is kept in the gas-filled volume at a working pressure below 10 bar and the laser beam has a laser center wavelength selected in a wavelength range from mid-IR to XUV. Preferably, the ultra-sound field is focused in the interaction region. Alternatively, a non-focused ultra-sound field is created in the interaction region. Furthermore, the inventive method preferably is conducted with the acousto-optical modulator apparatus according to the first general aspect of the invention or an embodiment thereof.

The term "acousto-optically deflecting a laser beam" refers to the deflection of light at a spatial gas density modulation creating a diffraction lattice, e.g. as it is known from conventional AOM's. Deflecting the laser beam in the interaction region preferably comprises a complete deflection. Depending on the application of the invention, deflecting the laser beam may comprise a partial deflection, of e. g 50% or even less. Deflection also can be understood as a reflection or diffraction at the diffraction lattice. The term "laser beam" refers to a light field with a degree of phase coherence, e. g. a continuous wave or pulsed laser radiation, in particular to a light field created by a laser source device and/or circulating in an optical set-up including a laser oscillator. Preferably, the laser beam is collimated or nearly collimated.

The diffraction lattice is created in the working gas. The working gas is provided in a gas-filled volume, i. e. a spatial volume range being confined by an enclosure or without a confinement with solid materials. The input and output sections are spatial ranges, typically at opposing sides of the working gas, where at least the laser beam to be deflected enters or leaves the working gas. Preferably, the laser beam has a free light path without solid or liquid refractive media between the input and output sections. Optionally, at least one reflective surface can be provided e. g. in or outside of the working gas, e. g. for folding the laser beam path therein. The laser beam path is folded while passing the working gas multiple times. Advantageously, with folding the laser beam path, multiple passages of the laser beam through the interaction region can be obtained, thus increasing the efficiency of the laser beam deflection.

A connection line between the input and output sections, at least in the range of the preferably focused ultra-sound field, is called reference axis (z-axis). The incidence light path and/or the deflection light path can be parallel or inclined relative to the reference axis. The propagation direction of the ultra-sound field intersects the incidence light path in the interaction region with an angle deviating from the reference axis, preferably with an angle perpendicular to the reference axis. Alternatively, the propagation direction of the ultra-sound field may intersect the reference axis with an angle deviating from the perpendicular angle, e. g. if the incidence light path coincides with the reference axis.

The term "ultra-sound transducer device" refers to an ultra-sound source preferably comprising a plurality of oscillating elements, e. g. piezoelectric ultras-sound transducer elements, like a phased array of piezoelectric ultras-sound transducer elements. A control device can be provided for driving and controlling the ultra-sound transducer device, optionally for shaping the ultra-sound field and the focus thereof.

Optionally, the ultras-sound-source can be combined with a transverse ultras-sound waveguide arrangement. Advantageously, the ultras-sound waveguide allows to optimize the ultras-sound wave front shape and/or the ultrasound focus intensity.

Advantageously, the inventors have found that limitations of conventional techniques can be avoided if the ultra-sound field is focused in the interaction region. Firstly, the working pressure can be reduced to a pressure below 10 bar, so that a high-pressure cell as proposed in [1] is no longer needed and the complexity of the AOM setup is reduced. In particular, thick cell windows can be avoided, thus allowing an extension of the usable wavelength range from mid-IR to XUV. As a further advantage, laser beam energies can be increased and a risk of laser beam distortions and/or thermal limitations can be reduced due to the omission of thick cell windows. Furthermore, focusing allows the creation of an increased gas density modulation in the interaction region, resulting in a more efficient Bragg deflection of the laser beam.

The invention has the following further advantages. For the first time, employment of a gas as diffractive medium allows the provision of an AOM suitable for routine applications, in particular in the XUV wavelength range. The inventive AOM provides completely new parameter regimes for AOM operation including: high-power beam distortion-free operation, extended wavelength range, reduced insertion losses, reduced thermal issues, reduced damage problems. In comparison to common bulk-based AOMs, beam distortion-free and damage-free operation is possible at higher peak power and high switching rates, and operation over a large laser wavelength range is possible, extending beyond the range for which transparent solid materials exist. Furthermore, low insertion losses can be provided by the inventive AOM in contrast to conventional AOM's as material boundaries as required for bulk-based AOMs can be avoided. Furthermore, thermal limitation at high average laser power can be reduced. The usage of gas as an AOM medium and the application of preferably focused ultrasound opens completely new applications and parameter regimes for AOM's by surpassing the limitations of the conventional techniques.

Advantageously, the preferably focused ultra-sound beam makes AOM operation possible even at low gas pressure. According to a preferred embodiment of the invention, the gas-filled volume is arranged for keeping the working gas at the working pressure equal to or above atmospheric pressure (pressure of surrounding atmosphere). A pumping system can be provided for setting the working gas pressure. To this end, the working gas can be adjusted connected with a feed pump or a gas reservoir with a predetermined pressure, e. g. in a gas tank or the surrounding atmosphere at normal pressure. With keeping the working gas at the working pressure equal to or above atmospheric pressure, particular advantages in terms of reduced design requirements to the input and output sections and an enclosure confining the working gas can be obtained. Providing the working gas at the working pressure above atmospheric pressure in particular comprises setting the working pressure such that a pressure difference relative to the surrounding in a range from 1 bar to 10 bar can be created e. g. by the pumping system.

Preferably, the acousto-optical modulator apparatus has a gas cell containing the gas-filled volume. The gas cell provides the enclosure confining the working gas. Walls of the gas cell are made of a gas tight material, and they can be rigid or flexible. Advantageously, the gas cell provides reproducible conditions of the working gas, and influences from the surrounding are avoided. The shape of the gas cell can be adapted to the shapes and dimensions of the incidence and deflection light paths and the ultra-sound field. As a preferred example, the gas cell has a longitudinal shape extending parallel to the reference axis. Preferably, the pumping system is coupled with the gas cell for setting the pressure therein.

As a further advantage, the gas cell offers multiple design options for providing the input and output sections. According to a first variant, the gas cell has open windows providing the input and output sections. The gas-based AOM is operated in a solid window-free gas-cell (or in free space) employing the focused or non-focused ultra-sound beam providing the ultras-sound pressure for creating the refraction lattice and enabling efficient laser beam deflection. The gas cell with open windows has an inner pressure equal to or above atmospheric gas pressure. The open window embodiment has particular advantages in terms of avoiding any distortion of the laser beam by solid materials, thus facilitation in particular beam manipulation in XUV range and at high laser power.

According to a second variant, the gas cell has closed windows made of a transparent material, wherein the closed windows provide the input and output sections and the transparent material has a thickness equal to or below 5 mm and is selected for transmitting the laser wavelength selected in the wavelength range from mid-IR to XUV. Preferably, the closed window has a cross-sectional dimension, e. g. diameter, in a range from 5 mm to 30 mm. The transparent material can comprise e. g. a plane plate of quartz glass, fused silica, borosilicate, magnesium fluoride or calcium fluoride. The closed window embodiment has particular advantages in terms of adjusting the pressure in the gas cell and providing a pressure above the atmospheric gas pressure.

With a further variant, at least one of the input section and the output section may comprise multiple open windows with mutual spacings connected with a differential pumping system. Thus, a pressure gradient can be generated at the input and/or output section, facilitating the pressure adjustment in the gas cell, while keeping the input and/or output section open, i. e. free of solid refractive materials.

The above variants of the input section and the output section can be combined, depending on the particular application of the invention, e. g. by providing one of the input section and the output section as one or multiple open window(s) and the other one of the input section and the output section as a closed window.

According to a further preferred embodiment of the invention, the ultra-sound transducer device is configured for focusing the ultra-sound field with a cylindrical focusing geometry extending along the interaction region, i. e. along the reference axis. Advantageously, this geometry facilitates the efficiency of deflecting the laser beam as the beam path though the focus is extended compared with e. g. a point shaped focus.

If, according to another advantageous embodiment of the invention, an ultra-sound reflector is arranged adjacent to the gas-filled volume, wherein the ultra-sound transducer device and the ultra-sound reflector are arranged for creating a resonator geometry including the interaction region and being capable of a resonant enhancement of the ultra-sound field in the interaction region, the sound pressure in the interaction region and the efficiency of deflecting the laser beam can be increased.

Additionally or alternatively, a further (second) ultra-sound transducer device can be arranged for creating a further ultra-sound field intersecting the incidence light path in the interaction region within the gas-filled volume and enhancing the periodic density modulation of the working gas in the interaction region. Preferably, the second ultra-sound transducer device is arranged adjacent to the gas-filled volume for emitting ultra-sound waves in opposite direction relative to the ultra-sound wave emitted by the first ultra-sound transducer device. Advantageously, the second ultra-sound transducer device has a sound pressure increasing effect, e. g. like the ultra-sound reflector.

Like the first ultra-sound transducer device, the second ultra-sound transducer device preferably comprises multiple oscillating elements, e. g. a phased array of piezoelectric ultras-sound transducer elements. The second ultra-sound transducer device can be driven and controlled with the control device for shaping the ultra-sound field and optionally with a focus thereof, such that the ultra-sound field of the first ultra-sound transducer device is constructively enhanced.

Working gases that are transparent or weakly absorptive can be found for a wavelength range spanning from the mid infrared to the extreme ultraviolet. Therefore, AOM operation is feasible over a very large wavelength range. Preferably, the working gas comprises at least one of xenon, krypton, argon, sulfurhexafluoride and air. These gases have advantages in terms of availability and efficiency of creating a refractive index modulation.

According to a preferred embodiment of the inventive method, an angle between the incidence light path and a direction perpendicular to the propagation direction of the ultra-sound field in the interaction region is equal to the Bragg angle for deflecting the laser beam by Bragg-diffraction of first order. Advantageously, the Bragg-diffraction of first order has a high efficiency. Alternatively, the angle between the incidence light path and a direction perpendicular to the propagation direction of the ultra-sound field in the interaction region is equal to the Bragg angle for deflecting the laser beam by Bragg-diffraction of higher order, e.g. 2nd order. Accordingly, advantages in terms of an operation with shorter laser wavelengths operated can be obtained.

In addition, the inventors have found that, by utilizing Bragg deflection of first or higher order, multiple diffraction maxima can occur with increasing length of the interaction region along the reference axis. Advantageously, deflecting the laser beam at a maximum other than the first maximum can enable increased deflection efficiency.

With another particularly advantageous embodiment of the invention, the diffraction efficiency can be increased via increasing nonlinear refractive index modulation in the interaction region by at least one of tuning the laser center wavelength close to an atomic or molecular resonance of the working gas and selecting the working gas having an atomic or molecular resonance located spectrally in close proximity to the laser wavelength. By utilizing atomic and/or molecular resonances of the working gas, the amplitude of refractive index modulation is increased, so that Bragg deflection of first or higher order is increased and/or the lengths of the interaction region along the reference axis can be shortened.

Advantageously, the laser beam can be focused to a focus point behind the interaction region. With this embodiment, the focus preferably is shaped such that a beam radius of the laser beam is minimized at the focus point. The focus preferably is configured such that the laser beam focus is located close to a beam deflection point located at a distance behind the AOM apparatus. This way a complete separation of transmitted and deflected beam portions can be reached at reduced deflection angle while ensuring reasonable deflection efficiency and minimal walk-off effects, which typically occur at small beam diameters.

Advantageously, further applications of the invention are available alternatively or additionally to the deflection of a single laser beam out of the incidence light path. The laser beam can be manipulated in the interaction region simultaneously with at least one further laser beam. According to a first variant, before entering the interaction region, the laser beam is co-propagating with a further laser beam, the laser beam is split from the further laser beam in the interaction region by the Bragg-diffraction in the ultra-sound field, and the further laser beam passes through the interaction region without deflection. Accordingly, the AOM apparatus can be provided as a beam splitter. According to a second variant, a further laser beam is directed to the interaction region with a direction deviating from the incidence light path, the further laser beam passes through the interaction region without deflection, and the laser beam is superimposed with the further laser beam in the interaction region by Bragg-diffraction in the ultra-sound field. With this embodiment, a beam combiner is provided. These variants can be extended to splitting or combining the initial laser beam with two or more further laser beams.

The (initial) laser beam and at least one further laser beam may have equal or different center wavelengths. In the latter case, a dichroic beam splitter or a dichroic beam combiner can be utilized by the invention.

Advantageously, according to a further application of the invention, spectral phase and/or amplitude of a deflected or transmitted laser beam, in particular pulsed laser beam, can be altered by adjusting ultrasound field parameters, such as frequency, amplitude and/or phase, of the ultrasound field along the propagation direction of the laser beam. In particular, the spatial distribution of the ultrasound field can be set non-uniformly along the propagation direction of the laser beam such that a frequency chirp of deflected laser pulses is caused. A similar application is disclosed in [4], where a more complex configuration including a longitudinal ultra-sound resonator is required.

Features disclosed in the context of the AOM apparatus and the embodiments thereof also represent preferred features of the inventive method and the embodiments thereof and vice versa. The aforementioned aspects and inventive and preferred features, in particular with regard to the configuration of the AOM apparatus as well as e.g. the configurations and compositions of individual components which have been described in relation to the AOM apparatus, therefore also apply for the method. The preferred embodiments, variants and features of the invention described above are combinable with one another as desired.

BRIEF DESCRIPTION OF THE DRAWINGS

Further details and advantages of the invention are described in the following with reference to the attached drawings, which schematically show in.

DETAILED DESCRIPTION OF PREFERRED EMBODIMENTS

Features of embodiments of the invention are described in the following with particular reference to the design of a gas cell accommodating the working gas and to the creation of a focused ultras-sound field. The implementation of the invention is not restricted to the illustrated embodiments, but rather possible with alternative features, wherein e. g. the gas cell is omitted and the inventive deflection of a laser beam is carried out in a larger gas filled set up, including the AOM apparatus and a laser apparatus creating the initial laser beam and optionally at least one further laser beam to be manipulated by the AOM apparatus, and/or with the creation of a non-focused ultras-sound field. Details of creating laser beams, optional folding the laser beam path while passing the working gas multiple times, with at least one reflective surface, and creating focused or non-focused ultras-sound fields e.g. with phased array transducers are not described as far as they are known per se from prior art techniques.

Exemplary reference is made to deflecting a laser beam from an incidence light path. Other applications of the invention, like splitting or combining multiple laser beams with equal or different wavelengths can be carried out in an analogue manner. For the combination of laser beams, both beams would have to be in the Bragg angle where the Bragg angle occurs twice and is therefore used for both rays: positive and negative relative to alignment of the ultrasonic wave fronts. More than two beams can be manipulated by utilizing higher order Bragg angles.

Embodiments of the AOM Apparatus

Figure 1:
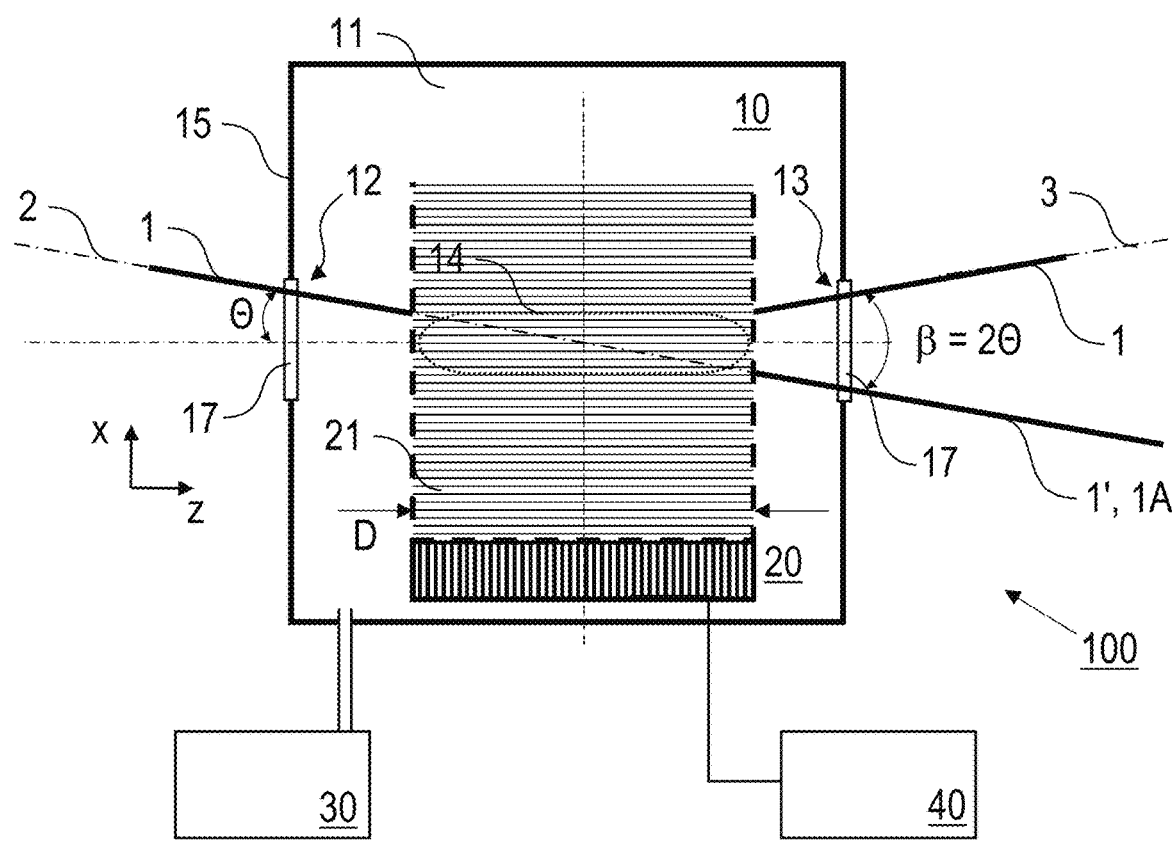
FIG. 1: features of a first embodiment of the inventive AOM, including closed windows at the input and output sections.

According to FIG. 1, the AOM apparatus 100 of a first embodiment comprises the gas-filled volume 10 including the working gas 11, like e. g. Xe, which is accommodated in a gas cell 15. Furthermore, the AOM apparatus 100 comprises an ultra-sound transducer device 20 being arranged in acoustic contact with the working gas 11 within the gas cell 15. The ultra-sound transducer device 20 is connected with a control device 40, like a control computer. Furthermore, the AOM apparatus 100 is provided with a pumping system 30, which is arranged for setting an inner pressure of the working gas 11 within the gas cell 15.

The employed working gas 11 in the gas-filled volume 10 is selected to have a sufficiently high refractive index at the wavelength of the incident laser beam 1. This can be reached by a suitable choice of one of gas type and gas pressure.

The gas-filled volume 10 has an input section 12 and an output section 13, which are arranged at opposite walls of the gas cell 15. With the illustrated embodiment, the input and output sections 12, 13 are closed windows 17, which comprise plane plates of a transparent material, like. e. g. fused silica, quartz, borosilicate, which has a thickness of e. g. 3 mm. The windows 17 are integrated into the wall of the gas cell 15. The gas cell 15, including the windows 17 provides a gas-tight enclosure of the gas-filled volume 10. Walls of the gas cell 15 are made of e. g. plastics or metal.

The ultra-sound transducer device 20 is located inside the gas-filled volume 10 or integrated into a cell wall of the gas cell 15. The ultra-sound transducer device 20 comprises a phased-array transducer, including a plurality of controllable piezo-electrical elements, and it is configured for creating an ultra-sound field 21 within the working gas 10. For efficient transmission of the ultras-sound wave into the working gas 11, impedance matching is preferably provided. Furthermore, it is preferably avoided that the ultras-sound wave distorts the waves formed within the laser-ultra-sound interaction volume 14 e. g. via reflection at any object within or outside the gas cell 15, for instance by using at least one absorber (see below).

The ultra-sound transducer device 20, preferably with a plane surface, emits the ultra-sound field 21 along an ultra-sound propagation direction (here: x-direction). The ultra-sound field 21 is created with an ultra-sound frequency f preferably selected above $200/\sqrt{\lambda}$ [f in Hz, $\lambda$ in m], with the laser beam center wavelength $\lambda$. The ultra-sound field 21 intersects the connecting line between the input and output sections 12, 13. The ultra-sound field 21 has sufficiently large sound pressure within the elongated laser-ultra-sound interaction region 14 orientated with its symmetry axis parallel to the wave fronts of the ultra-sound wave. Ultra-sound wave production preferably provides a plane or close-to-plane wave front along the symmetry axis of the elongated volume. The length of the laser ultra-sound interaction region 14 can be chosen to maximize deflection efficiency.

By driving the ultra-sound transducer device 20 with the control device 40, a periodic density modulation is created in the working gas 11, wherein the density modulation creates a refractive index modulation forming a Bragg lattice as discussed in detail below. In particular, the refractive index modulation in the working gas 11 is obtained from the ultra-sound waves where high amplitudes create a higher refractive index and the zero-crossings of the amplitude create a lower refractive index. Accordingly, the Brag lattice is created with a period, which determined by the wavelength of the ultra-sound field 21 and selected in dependency of the center wavelength of the laser beam 1. Lines of equal refractive index of the Brag lattice extend parallel to the surface of the ultra-sound transducer device 20.

As shown in FIG. 1, the incident laser beam 1 is directed along an incidence light path 2 through the input section 12 into the working gas 10. With practical examples, the laser beam 1 is created by a laser source device and/or circulates in a resonator (not shown). Preferably, the laser beam should be approximately collimated while passing the ultra-sound field 21. Alternatively, the laser beam 1 can be focused to a focus point outside the AOM apparatus (see FIG. 6). The laser wavelength can vary over a large range from the mid infrared to the extreme ultraviolet spectral range. An angle between the incidence light path 2 and the traverse extension of the maxima of the Bragg lattice (z-axis) is selected to be equal to the Bragg angle $\theta$ fulfilling the Bragg condition $\sin\theta = \lambda/2\Lambda$ or, with applying a small angle approximation, $\theta = \lambda/2\Lambda$, with the center wavelength $\lambda$ of the laser beam 1 and the Bragg period $\Lambda$ of the density or refractive index modulation. The deflection angle $\beta$ between the deflected laser beam 1 and a non-deflected residual portion 1' of the laser beam or a further laser beam 1A travelling along the incidence light path 2 with another wavelength is $\beta = 2\theta$. With reference to the ultrasound frequency f and speed of sound c, $\theta$ can be calculated according to $\theta = \lambda f/2c$. With a practical example, for deflecting a laser beam 1 with a center wavelength of 2 μm using an ultrasound frequency of 400 kHz in Xenon (c=178 m/s), the deflection angle $\beta = 2\theta$ is 4.5 mrad.

The spatial range where the laser beam 1 crosses the ultra-sound field 21 represents the interaction region 14 (schematically illustrated with dotted line), where the laser beam 1 is deflected onto a deflection light path 3 through the output section 13 out of the working gas 11. The length D of the interaction region 14 is e. g 10 cm.

Figure 2:
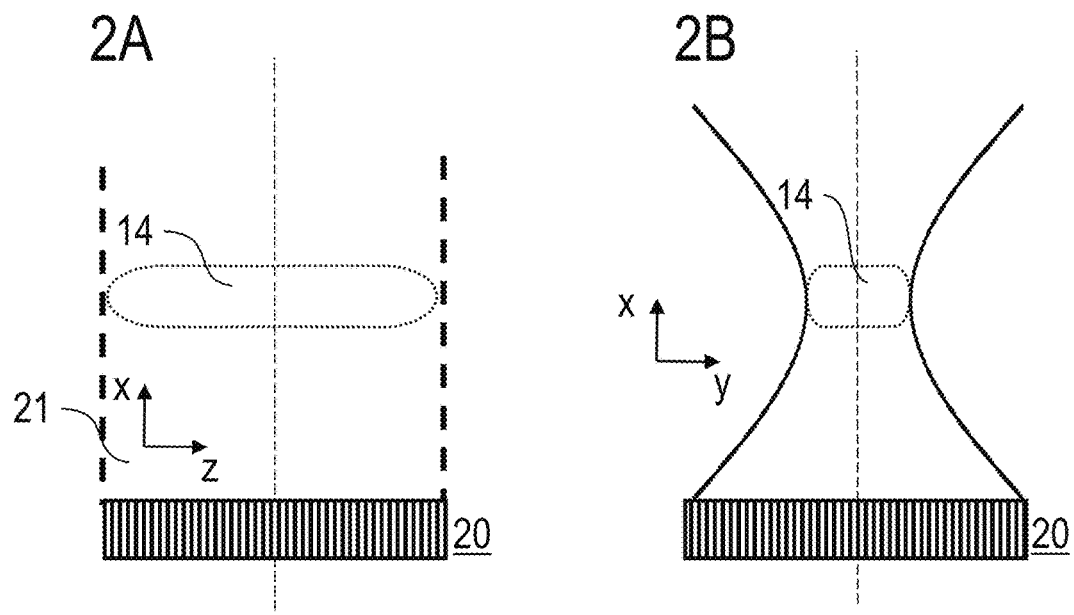
FIG. 2: illustrations of a cylindrical focus of the ultrasound field.

FIG. 2 schematically illustrates an example of a focused ultra-sound field 21 created with the ultra-sound transducer device 20. According to FIG. 2A, the view on the x-z-plane is shown as illustrated in FIG. 1. The interaction region 14 extends in the z-direction with the longitudinal length of e. g. 100 mm and an extension in x-direction of e. g. 5 mm. FIG. 2B shows the cross-sectional view of the ultra-sound field 21 along the x-y-plane. In the range of maximum convergence (focus of the ultra-sound field 21), the interaction region 14 is provided, where the laser beam is deflected.

With a practical example, the AOM 100 is operated with the following conditions: volume of gas cell 15: x=1 m*y=1 m*z=3 m); length D: D<200 mm; laser beam wavelength: 2 μm; laser beam radius W: W<10 mm, e. g. 0.5 mm; ultra-sound frequency: 400 kHz; working gas: Xenon at 1 bar with refractive index n−1=7*10$^{-4}$ and speed of sound 178 m/s; refractive index modulation depth δn: δn=2.25× 10$^{-5}$; and sound pressure in laser-ultra-sound field interaction region 14: 163.8 dB$_{SPL}$ and angle of incidence θ: 2.25 mrad. This example configuration is preferred for switching rates equal to or below about 100 kHz (considering ultra-sound field production with a single transducer or transducer array used without reflector) due to the relatively slow speed of sound in Xenon. For higher switching rates, e.g. reaching the MHz regime, gases such as e.g. Helium at high pressure and/or gases with resonances close to the center laser wavelength and/or smaller beam diameters are utilized.

Figure 3:
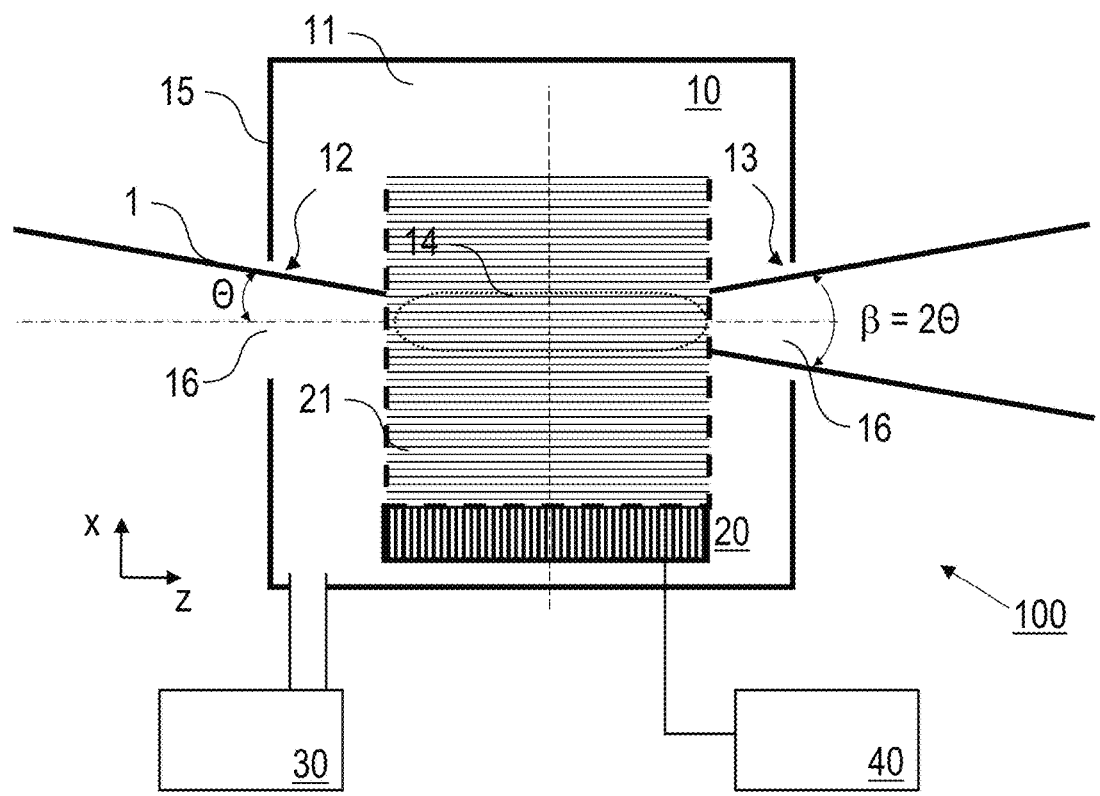
FIG. 3: features of a second embodiment of the inventive AOM, including open input and output sections.

FIG. 3 illustrates a second embodiment of the AOM apparatus 100, which is substantially configured like the first embodiment of FIG. 1, including the gas-filled volume 10, the ultra-sound transducer device 20, the pumping system 30 (optionally provided with his embodiment) and the control device 40. Deviating from the first embodiment of FIG. 1, the second embodiment of FIG. 3 has open windows 16 as input and output sections 12, 13. Accordingly, the wall of the gas cell 15 has openings, wherein the working gas 11 is in free contact with the gas, like atmospheric air, surrounding the AOM apparatus 100.

As described with reference to FIG. 1, the laser beam 1 to be deflected is directed through the input section 12 with the Bragg angle θ to the ultra-sound field 21 of the ultra-sound transducer device 20 and deflected with the deflection angle β in the interaction region 14. The inner pressure of the working gas 11 in the gas cell 15 can be adjusted with the pumping system 30 to a pressure equal to or above atmospheric pressure with the pumping system 30, which comprises for instance a usual feed pump.

Figure 4:
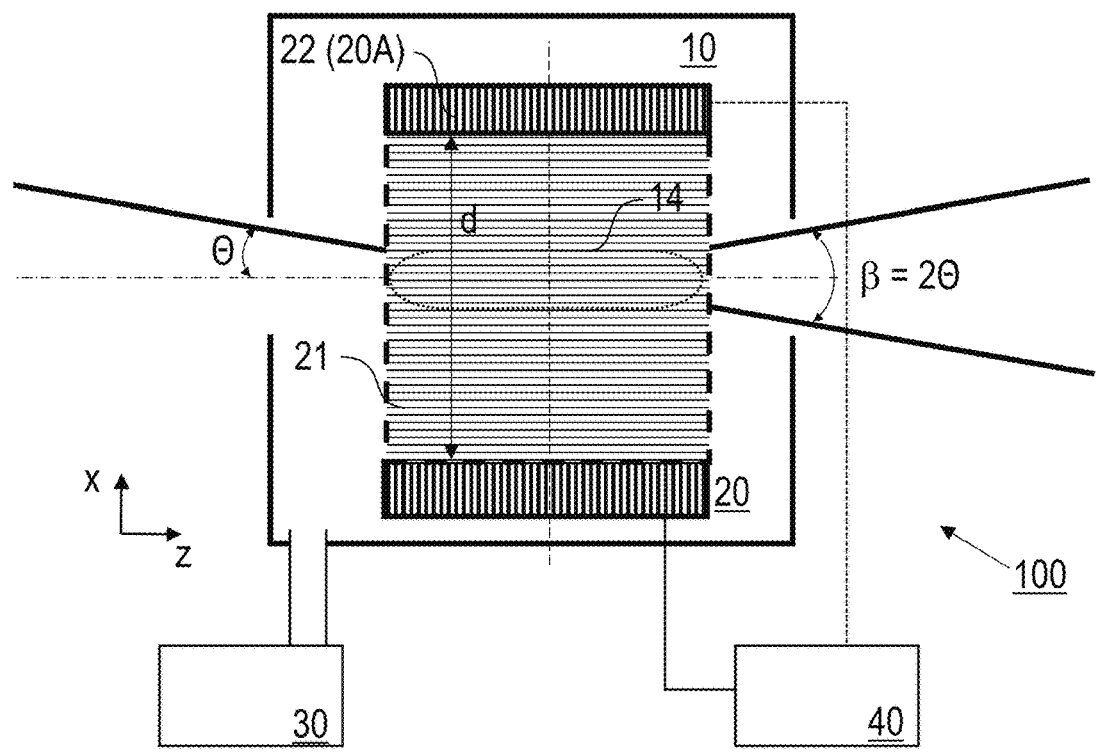
FIG. 4: a variant of the embodiment of FIG. 3, including an ultras-sound reflector.

FIG. 4 illustrates variants of the first and second embodiments of the AOM apparatus 100 with the gas-filled volume 10, the first ultra-sound transducer device 20, the optional pumping system 30 and the control device 40, wherein an ultra-sound reflector 22 and/or a second ultra-sound transducer device 20A is arranged adjacent to, preferably within, the gas-filled volume 10.

The ultra-sound reflector 22 is arranged with a distance din propagation direction of the ultras-sound wave from the surface of the ultra-sound transducer device 20. The distance d is selected such that a resonator geometry is created, wherein the ultra-sound field 21 is resonantly enhanced by the constructive interference of the ultra-sound field created by the ultra-sound transducer device 20 and the ultra-sound field reflected by the ultra-sound reflector 22, in particular in the interaction region 14. The distance d is e. g. 20 mm.

The alternative second ultra-sound transducer device 20A is configured like the first ultra-sound transducer device 20, and it includes a connection (dashed line) with the control device 40. A further ultra-sound field is created with the second ultra-sound transducer device 20A, wherein the further ultra-sound field has a travelling direction opposite to the travelling direction of the ultra-sound field 21 of the first ultra-sound transducer device 20 and a shape such that the sound pressure of the ultra-sound field 21 is increased at least in the focus thereof.

Optionally, both of the ultra-sound reflector 22 and the second ultra-sound transducer device 20A can be provided, e. g. by designing the second ultra-sound transducer device 20A with distances between the actively driven piezo-electrical elements thereof and by providing the ultra-sound reflector 22 such that reflecting sections are arranged between the actively driven piezo-electrical elements.

According to an additional variant, an ultra-sound reflector can be provided by reflecting sections between actively driven piezo-electrical elements also with the first ultra-sound transducer device 20. Thus, the first ultra-sound transducer device 20 including the ultra-sound reflector can be combined with the ultra-sound reflector 22 alone, the second ultra-sound transducer device 20A alone or the combined second ultra-sound transducer device 20A including the ultra-sound reflector 22.

According to a further variant of the first and second embodiments (not shown in the figures), at least one ultra-sound absorber can be provided instead of or additionally to the ultra-sound reflector 22 and/or the second ultra-sound transducer device 20A. The absorber is made of e.g. polyurethane and/or is created with a sound diffusing and/or absorptive surface structure. Optionally, the at least one ultra-sound absorber can be provided in the gas cell 15 e. g. on inner sides of the walls thereof. Advantageously, each absorber allows the suppression of the ultra-sound field 21 after passing through the interaction region 14.

Figure 5:
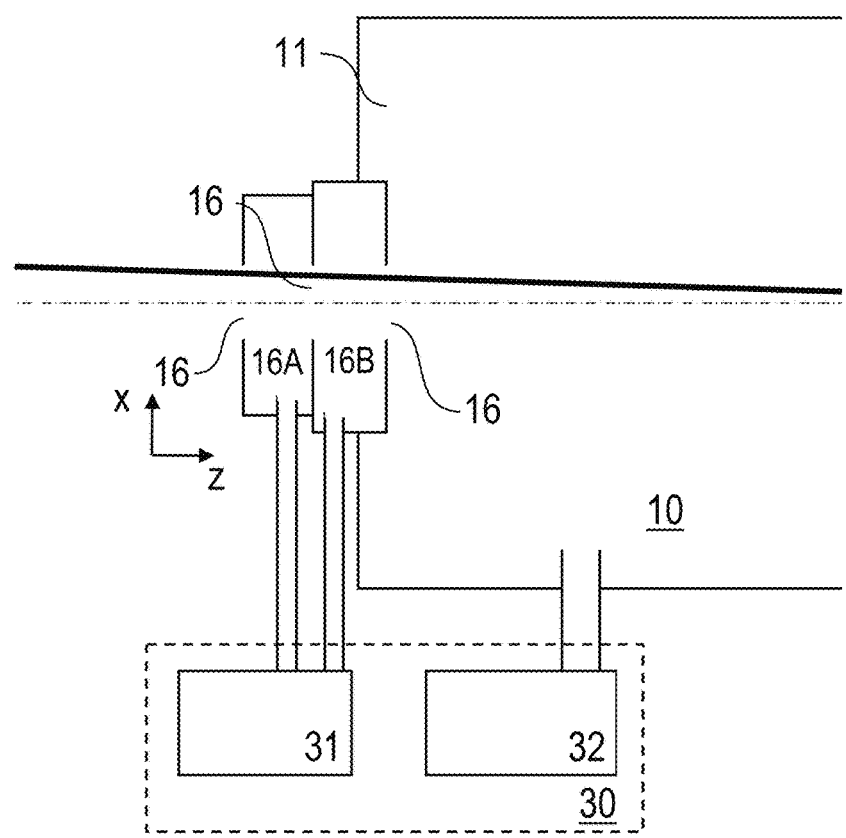
FIG. 5: an enlarged illustration of an open input or output section, provided with differential pumping.

FIG. 5 illustrates a further modification of the second embodiment of FIG. 3 or 4, wherein the open input and/or output sections 12, 13 are replaced by a sequence of at least two windows 16, which are arranged with mutual spacings along the z-axis. The exemplary illustration shows three windows 16 with mutual spacings 16A, 16B, wherein each spacing 16A, 16B is connected with the pumping system 30. With more details, the pumping system 30 comprises a differential pumping system 31 and optionally a further feed pump 32 connected with the gas-filled volume 10. The differential pumping system 31 has multiple feed pumps being operable with different pumping speed, so that a pressure gradient between outer pressure (equal to or below atmospheric pressure) and inner pressure (above atmospheric pressure) can be adjusted via the windows 16.

The embodiment of FIG. 5 has the following advantage. Even if the AOM apparatus 100 is operated in an atmospheric environment, a n increased pressure can be adjusted in the working gas 11 with high precision and reproducibility. The pressure gradient between the atmospheric pressure in the surrounding and the increased pressure within the gas-filled volume 10 can be adjusted with the multiple open windows 16 and the pressurized spacings 16A, 16B therebetween.

Figure 6:
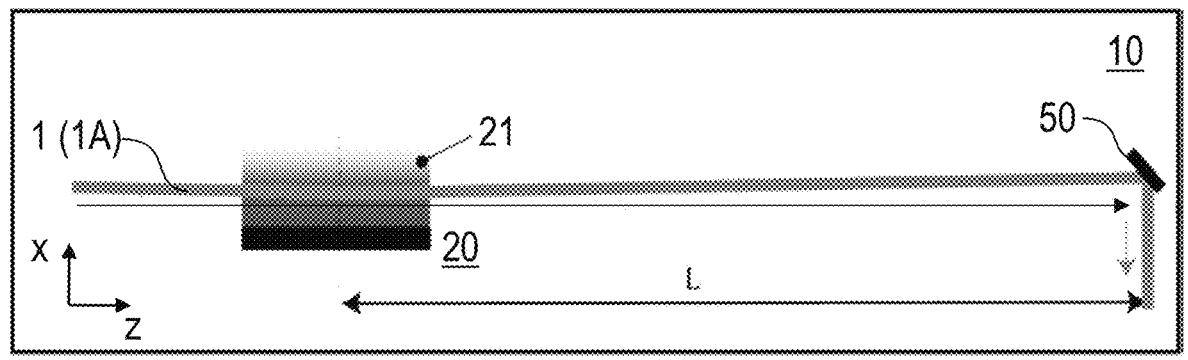
FIG. 6: an illustration of a practical application of the invention.

A practical implementation of the invention for deflecting a portion of an incident laser beam 1 or a combination of incident laser beams 1, 1A is shown in FIG. 6. The incidence light path of the laser beam 1 represents an optical axis of an optical set-up, like the light path within a resonator e. g. for light field enhancement by pulse stacking (not shown). For example, a portion of the laser beam 1, like enhanced pulses, is to be extracted from the resonator beam path via a mirror 50. The example setup is arranged within a large gas-filled volume 10 (e.g. 1 m*1 m*3 m, filled with Xe with a pressure of 1 bar) in which the ultra-sound transducer device 20 is mounted in order to produce the ultra-sound wave with planar or close to planar wave-fronts and high sound pressure over an interaction region 14 volume of size R*R*D=5 mm*5 mm*100 mm.

The collimated incident laser beam 1 with beam waist (1/e$^2$ intensity) diameter between 1 and 5 mm travels along the incidence light path 2, which inclined relative to the z-direction. The ultra-sound field 21 is created in Xe working gas such that the Bragg angle θ is formed between the incident laser beam 1 and the Bragg lattice of the ultra-sound field 21. To this end, the ultra-sound field 21 created by the ultra-sound transducer device 20 propagates perpendicular to the z-axis.

The gas pressure gets modulated within the laser-ultrasound interaction region, causing a refractive index modulation of $\delta n=2.2*10^{-5}$. After interaction with the ultra-sound field 21, a portion of the incident laser beams is deflected as the deflected laser beam to the mirror 50, which is placed adjacent to the beam path along the z-axis with a distance L of e. g. 2 m from the ultra-sound field 21. At the 2 m distance behind the center of the ultra-sound field 21, the separation between transmitted and deflected beam (center to center) is about 9 mm, so that sufficient space is obtained for positioning the mirror 50 without deteriorating the beam path along z-axis. With the mirror 50, the deflected laser beam is directed out of the resonator beam path for further applications. The mirror 50 can be used to direct deflected (or transmitted) beams in any direction, enabling full separation of two beam portions or two beams.

Figure 7:
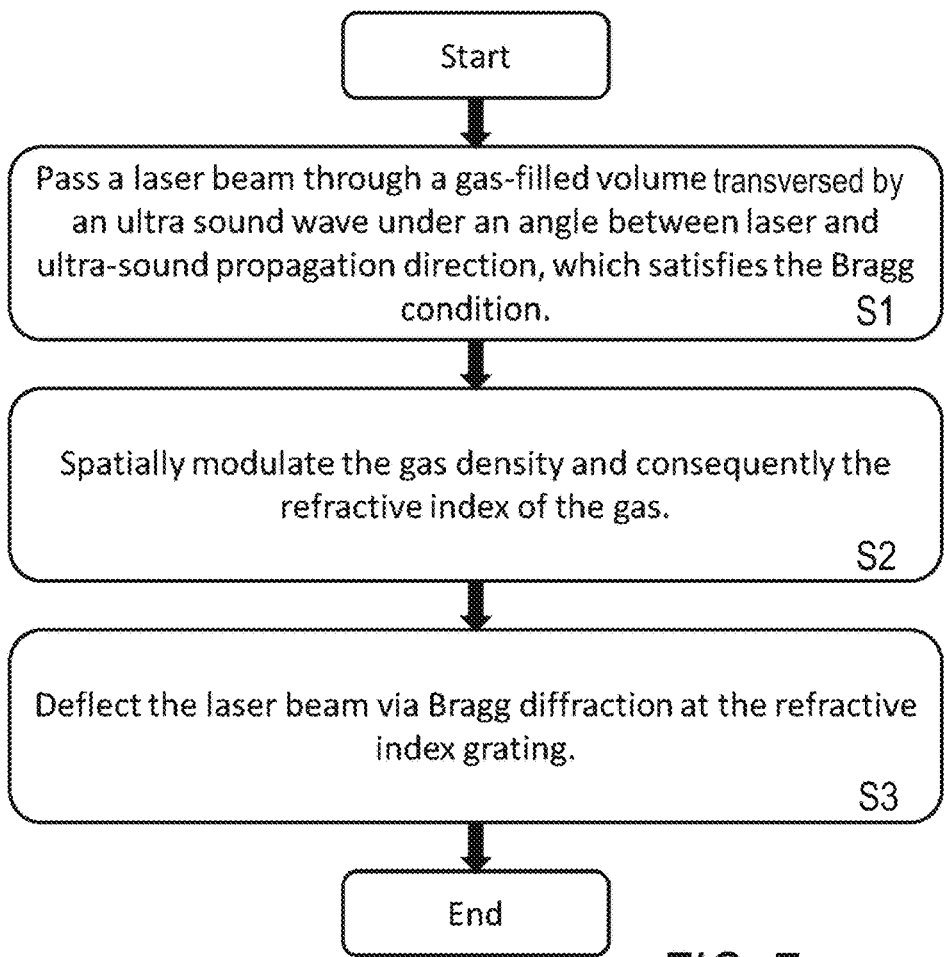
FIG. 7: a flowchart illustrating features of the inventive method of acousto-optically deflecting a laser beam.

FIG. 7 summarizes the steps of the acousto-optically deflecting a laser beam 1 according to preferred features of the invention. With the first step S1, the laser beam 1 is passed through the gas-filled volume 10 traversed by the ultra-sound field 21 under an angle between the laser beam 1 and the ultra-sound propagation direction, which satisfies the Bragg condition. The gas density and consequently the refractive index of the gas is spatially modulated by the ultra-sound field 21 (step S2). This results in the deflection of the laser beam 1 via Bragg diffraction at the refractive index grating formed in the gas (step S3).

Figure 8:
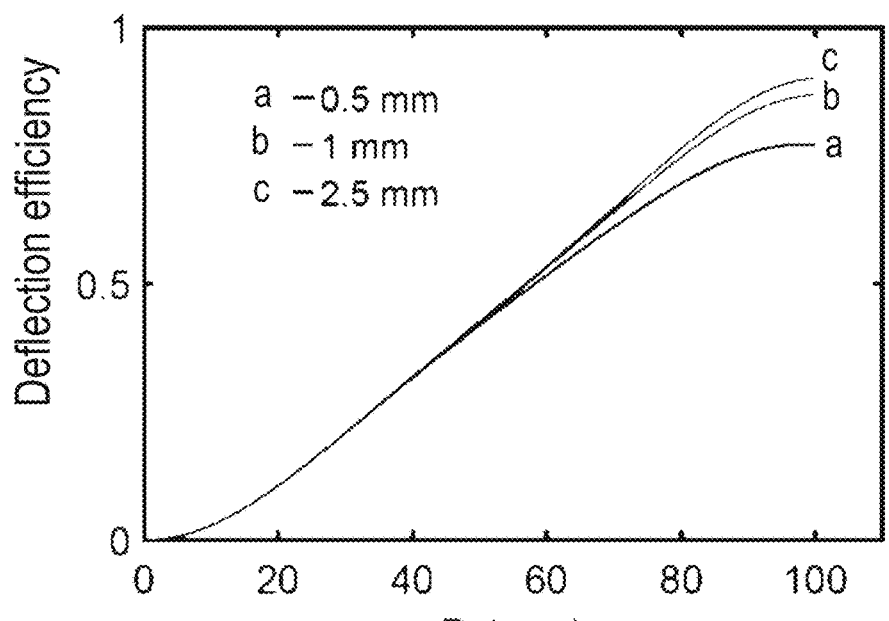
FIG. 8: a simulation result illustrating the diffraction efficiency in dependency on an axial length of an interaction region.

The example configuration of FIG. 7 was tested employing the above parameters via numerical simulations using a commercial three-dimensional laser beam propagation code. The key result is displayed in FIG. 8 which shows the calculated deflection efficiency (1 denotes 100% deflection) as a function of propagation length D within the AOM apparatus 100 for different beam radii. The deflection efficiency is increased with the length D of the interaction region 14 (see FIG. 1) and in dependency on the laser beam radius. A deflection efficiency above 90% has been reached e. g. when employing a laser beam at 2 μm wavelength with radius (defined via $1/e^2$ intensity) of 2.5 mm. Taking into account a beam radius of 2.5 mm, and considering laser pulses with duration of 5 ps, pulse energies approaching the Joule-level can be employed without causing major beam distortions. Higher pulse energies or shorter laser pulses can be employed when gases with higher ionization potential such as e.g. argon are used as working gas.

Selection of Operation Conditions of AOM Apparatus 100

Selection of suitable operation conditions of the AOM apparatus 100 can be done by using reference values, numerical simulations and/or tests. Preferably, the following considerations are used, which facilitate finding useful parameter ranges including regimes in which lower or higher deflection efficiencies are reached.

Because of the weak dependency of the refractive index of gases on density modulations introduced by ultrasound-waves together with the limited transmission of ultrasound waves of short wave-length through gases, the following general characteristics 1. to 3. are preferred for providing high deflection efficiencies.

1. A sound-wave induced refractive index modulation on of sufficient magnitude is provided. This can be obtained by: a suitable gas type with large (n−1), a high gas pressure and/or a sufficiently high sound pressure. In addition, (n−1) can be maximized for particular wavelengths by utilizing atomic or molecular resonances in the gas.

2. A small deflection angle β is preferred in order to reach sufficient Fresnel reflection per single refractive index boundary despite the small δn. However, deflection angle β should not be chosen too small as operation at very small β might cause diffraction into multiple diffraction orders and thus less efficient transfer of optical power into the first (standard) order.

3. A long propagation length D within the ultra-sound field has advantages in order to reach a high deflection efficiency despite the small δn. A large laser beam diameter is preferred in order to reach a high diffraction efficiency and minimize walk-off effects.

The Bragg diffraction angle can be calculated as (small angle approximation):

$$\Theta = \frac{m\lambda}{2\Lambda}$$

with λ denoting the optical wavelength in the gas medium. $\Lambda=c_s/f$ denotes the refractive index modulation period of the ultrasound wave of frequency f and velocity $c_s$. For the first and usually most efficient diffraction order, the index m equals unity. Without restriction to this condition, in the following solely diffraction in first order (m=1) is considered.

The deflection angle in an AOM β=2Θ thus becomes:

$$\beta = \frac{\lambda f}{c_s}$$

In order to separate transmitted and deflected beams at a distance L (see FIG. 6) after passing the AOM apparatus 100, the deflection angle preferably is larger than the effective beam divergence angle defined as $\alpha=2\omega(L)/L$ with ω(L) denoting the beam diameter at distance L from the beam waist. For a Gaussian laser beam, α can thus be written as (small angle approximation):

$$\alpha = \frac{2w_0}{L}\sqrt{1+\frac{L^2}{z_0^2}}$$

Here it is considered for simplicity a beam waist w0 and Rayleigh length z0 centered in the AOM apparatus 100. Placing the beam waist behind the AOM apparatus 100, e.g. at the spatial separation point at a distance L behind the AOM apparatus 100 can relax the angular deflection requirement but would cause a reduced deflection efficiency caused by the non-planar wavefronts within the AOM apparatus 100. For large z0, the above equation can be simplified:

$$\alpha \approx \frac{2w_0}{L}\left(1+\frac{L^2}{z_0^2}\right)$$

Now a threshold condition $\beta \geq \eta\alpha$ can be defined for deflecting the laser beam by an angle, which is η times the beam divergence angle. Solving for f yields the minimum ultrasound frequency required for beam separation $$f = \frac{2c_s \eta w_0}{L\lambda}\left(\frac{L^2\lambda^2}{2w_0^4\pi^2} + 1\right) \approx \frac{2c_s \eta w_0}{L\lambda}$$

This equation displays again an approximation for large $z_0$ (equal to large $w_0$). Without this approximation, f has a global minimum for $\delta_{0,min}=0.62\sqrt{L\lambda}$ at $$f_0 = \frac{1.66\eta c_s}{\sqrt{L\lambda}}$$

Taking into account realistic experimental examples in order to estimate the minimum ultra-sound frequency that can be employed to drive an AOM apparatus 100, such as L<5 m, $c_s$=178 m/s (Xenon), and $\eta$=1.5 the shortest wavelength that can be separated using an AOM apparatus 100 with ultra-sound frequency f can be calculated as:

$$\lambda_{min} \approx \frac{200^2}{f^2} m/s^2$$

As an advantageous example, for an ultrasound transducer device with frequency f=400 kHz, a minimum operation wavelength in the ultraviolet of 245 nm is obtained. For obtaining this threshold example, an optimum beam size of $\omega_{0,min}$=0.68 mm is preferably provided, which can be well below the beam size required for efficient deflection.

In order to reach a high diffraction efficiency over a reasonable propagation length D, a minimum refractive index modulation depth $\delta n$ is preferably created. $\delta n=(n-1)\delta p$ is calculated as a product of the pressure-dependent part of the refractive index, $(n-1)\propto p$ and the pressure modulation depth $\delta p$, which is usually provided in units of sound pressure (dBSPL).

For gases, considering the case far from resonances, the refractive index lies in a range of about $n-1=3*10^{-5}$ to $7*10^{-4}$ with $n-1\approx 2.9*10^{-4}$ for air at atmospheric pressure. $n-1$ increases approximately linearly with pressure. As a minimum condition the refractive index modulation depth resulting from air at atmospheric pressure with a high but still very reasonable ultrasound pressure of 134 $dB_{SPL}$ is considered, yielding $\delta p=1*10^{-2}$ and thus $\delta n\approx 3*10^{-6}$. An upper bound for $\delta n$ can hardly be defined as (n–1) can increase by orders of magnitude close to atomic/molecular resonances.

While simple analytical solutions can be derived for the diffraction efficiency of an AOM considering a plane wave with infinite beam size, the situation gets more complicated if a finite beam size is taken into account. Numerical simulations or experimental tests are therefore carried out to evaluate beam size $w_0$ and length D provided for efficient deflection as a function of wavelength, ultrasound frequency and refractive index modulation depth. From a practical point of view, a length of D<20 cm and beam sizes of $w_0$<10 mm are sufficient.

The features of the invention disclosed in the above description, the drawings and the claims can be of significance individually, in combination or sub-combination for the implementation of the invention in its different embodiments.

What is claimed is:

1. An acousto-optical modulator apparatus, being configured for acousto-optically deflecting a laser beam, comprising a gas-filled volume including a working gas and having an input section and an output section, being arranged for receiving the laser beam along an incidence light path via the input section and for transmitting the laser beam along a deflection light path via the output section, and an ultra-sound transducer device being arranged for creating an ultra-sound field intersecting the incidence light path in an interaction region within the gas-filled volume and creating a periodic density modulation of the working gas in the interaction region, wherein the ultra-sound transducer device is capable of deflecting the laser beam in the interaction region by Bragg-diffraction in the ultra-sound field, so that the deflection light path has a direction deviating from the direction of the incidence light path, wherein the gas-filled volume is arranged for keeping the working gas at a working pressure below 10 bar, and the input section and the output section are capable of transmitting the laser beam with a laser center wavelength included in a wavelength range from mid-IR to XUV, wherein the acousto-optical modulator apparatus is arranged such that an angle between the incidence light path and a direction perpendicular to a propagation direction of the ultra-sound field in the interaction region is equal to a Bragg angle for deflecting the laser beam by a Bragg-diffraction of a first or higher order.

2. The acousto-optical modulator apparatus according to claim 1, wherein the gas-filled volume is arranged for keeping the working gas at the working pressure equal to or above atmospheric pressure.

3. The acousto-optical modulator apparatus according to claim 1, wherein the ultra-sound transducer device is configured for focusing the ultra-sound field in the interaction region.

4. The acousto-optical modulator apparatus according to claim 1, further comprising a gas cell containing the gas-filled volume.

5. The acousto-optical modulator apparatus according to claim 4, wherein the gas cell has open windows providing the input and output sections.

6. The acousto-optical modulator apparatus according to claim 4, wherein the gas cell has closed windows made of a transparent material, the closed windows provide the input and output sections, and the transparent material has a thickness below 5 mm and is selected for transmitting the laser wavelength selected in the wavelength range from mid-IR to XUV.

7. The acousto-optical modulator apparatus according to claim 1, wherein at least one of the input section and the output section comprises multiple open windows with mutual spacings connected with a differential pumping system.

8. The acousto-optical modulator apparatus according to claim 1, wherein the ultra-sound transducer device is configured for focusing the ultra-sound field with a cylindrical focusing geometry extending along the interaction region.

9. The acousto-optical modulator apparatus according to claim 1, further comprising
an ultra-sound reflector being arranged adjacent to the gas-filled volume, wherein the ultra-sound transducer device and the ultra-sound reflector are arranged for creating a resonator geometry including the interaction region and being capable of a resonant enhancement of the ultra-sound field in the interaction region.

10. The acousto-optical modulator apparatus according to claim 1, further comprising
a further ultra-sound transducer device being arranged for creating a further ultra-sound field intersecting the incidence light path in the interaction region within the gas-filled volume and enhancing the periodic density modulation of the working gas in the interaction region.

11. The acousto-optical modulator apparatus according to claim 1, wherein
the working gas comprises at least one of xenon, krypton, argon, sulfurhexafluoride and air.

12. The acousto-optical modulator apparatus according to claim 1, wherein
at least one reflective surface is provided for folding the laser beam path in the working gas.

13. A method of acousto-optically deflecting a laser beam, comprising the steps of
providing a gas-filled volume including a working gas and having an input section and an output section,
receiving the laser beam along an incidence light path via the input section and transmitting the laser beam along a deflection light path via the output section,
creating an ultra-sound field intersecting the incidence light path in an interaction region within the gas-filled volume, wherein a periodic density modulation of the working gas is created in the interaction region, and
deflecting the laser beam in the interaction region by an effect of Bragg-diffraction in the ultra-sound field, so that the deflection light path has a direction deviating from the direction of the incidence light path, wherein
the working gas is kept in the gas-filled volume at a working pressure below 10 bar,
the laser beam has a laser wavelength selected in a wavelength range from mid-IR to XUV, and
an angle between the incidence light path and a direction perpendicular to a propagation direction of the ultra-sound field in the interaction region is equal to a Bragg angle for deflecting the laser beam by a Bragg-diffraction of a first or higher order.

14. The method according to claim 13, wherein
the working gas is kept in the gas-filled volume at the working pressure equal to or above atmospheric pressure.

15. The method according to claim 13, wherein
the ultra-sound field is focused in the interaction region.

16. The method according to claim 13, wherein
the input and output sections comprise open windows of the gas-filled volume through which the laser beam is transmitted.

17. The method according to claim 13, wherein
the input and output sections comprise closed windows of the gas-filled volume made of a transparent material having a thickness below 5 mm and being selected for transmitting the laser wavelength in the wavelength range from mid-IR to XUV.

18. The method according to claim 13, wherein
the ultra-sound field is focused in the interaction region with a cylindrical focusing geometry extending along the interaction region.

19. The method according to claim 13, comprising
resonantly enhancing the ultra-sound field in the interaction region by arranging an ultra-sound reflector adjacent to the gas-filled volume, said ultra-sound reflector creating a resonator geometry including the interaction region.

20. The method according to claim 13, comprising
creating a further ultra-sound field intersecting the incidence light path in the interaction region within the gas-filled volume with a further ultra-sound transducer device and enhancing the ultra-sound field in the interaction region with the further ultra-sound field.

21. The method according to claim 13, comprising
increasing a diffraction efficiency via increasing nonlinear refractive index modulation in the interaction region by at least one of tuning a laser center wavelength close to an atomic or molecular resonance of the working gas and selecting the working gas having an atomic or molecular resonance located spectrally in close proximity to the laser wavelength.

22. The method according to claim 13, comprising
focusing the laser beam to a focus point behind the interaction region.

23. The method according to claim 13, wherein
before entering the interaction region, the laser beam is co-propagating with a further laser beam,
the laser beam is split from the further laser beam in the interaction region by the Bragg-diffraction in the ultra-sound field, and
the further laser beam passes through the interaction region without deflection.

24. The method according to claim 23, wherein
the laser beam and the further laser beam have different center wavelengths.

25. The method according to claim 13, wherein
a further laser beam is directed to the interaction region with a direction deviating from the incidence light path,
the further laser beam passes through the interaction region without deflection, and
the laser beam is superimposed with the further laser beam in the interaction region by Bragg-diffraction in the ultra-sound field.

26. The method according to claim 25, wherein
the laser beam and the further laser beam have different center wavelengths.

27. The method according to claim 13, including a step of folding the laser beam path in the working gas while passing the working gas multiple times.

* * * * *